United States Patent [19]
Reiker

[11] Patent Number: 5,938,157
[45] Date of Patent: *Aug. 17, 1999

[54] FAN BRACE SLIDE SUPPORT

[76] Inventor: Kenneth H. Reiker, P.O. Box 4106, Shalimar, Fla. 32579

[*] Notice: This patent issued on a continued prosecution application filed under 37 CFR 1.53(d), and is subject to the twenty year patent term provisions of 35 U.S.C. 154(a)(2).

[21] Appl. No.: 08/402,331

[22] Filed: Mar. 10, 1995

Related U.S. Application Data

[63] Continuation-in-part of application No. 08/371,695, Jan. 12, 1995, Pat. No. 5,854,443.

[51] Int. Cl.⁶ ................................................ F16M 13/00
[52] U.S. Cl. ...................... 248/200.1; 248/906; 248/343; 248/298.1; 248/205.4; 248/217.3; 362/371; 156/71; 156/92
[58] Field of Search ................................ 52/39; 248/200.1, 248/906, 903, 323, 326, 343, 298.1, 205.3, 205.4, 57, 217.3; 362/147, 148, 364, 365, 366, 370, 371; 174/48, 57, 63; 156/71, 92

[56] References Cited

U.S. PATENT DOCUMENTS

| | | |
|---|---|---|
| Re. 33,147 | 1/1990 | Reiker . |
| D. 288,289 | 2/1987 | Reiker . |
| 1,133,535 | 3/1915 | Cain et al. . |
| 1,699,414 | 1/1929 | Weinstein ............................. 248/906 X |
| 1,805,027 | 5/1931 | Adell ................................... 248/906 X |
| 1,982,957 | 12/1934 | Knell ................................... 248/906 X |
| 2,316,389 | 4/1943 | Atkinson ............................. 248/906 X |
| 2,528,418 | 10/1950 | Buckels . |
| 2,788,188 | 4/1957 | Smith et al. ............................... 248/57 |
| 2,809,002 | 10/1957 | Rudolph . |
| 2,917,263 | 12/1959 | Appleton et al. . |
| 2,930,564 | 3/1960 | Maier ................................... 248/906 X |
| 2,945,661 | 7/1960 | Appleton . |
| 3,104,087 | 9/1963 | Budnick et al. . |
| 3,163,386 | 12/1964 | Collins ................................ 248/906 X |
| 3,214,126 | 10/1965 | Roos . |
| 3,425,655 | 2/1969 | Cogdill . |
| 3,518,421 | 6/1970 | Cogdill . |
| 3,616,096 | 10/1971 | Roeder ............................... 248/205.3 X |
| 4,037,098 | 7/1977 | Kowalski ............................. 248/323 X |
| 4,050,603 | 9/1977 | Harris et al. . |
| 4,062,512 | 12/1977 | Arnold . |
| 4,165,851 | 8/1979 | Bowden, Jr. et al. . |
| 4,275,862 | 6/1981 | Takagi et al. ......................... 248/205.3 |
| 4,463,923 | 8/1984 | Reiker . |
| 4,684,092 | 8/1987 | Reiker . |
| 4,717,101 | 1/1988 | Harrod ................................. 248/200.1 |
| 4,863,132 | 9/1989 | Fitzgerald et al. ................. 248/205.3 X |
| 4,909,405 | 3/1990 | Kerr, Jr. . |
| 4,967,990 | 11/1990 | Rinderer ............................... 248/906 X |
| 5,024,412 | 6/1991 | Hung et al. . |
| 5,044,582 | 9/1991 | Walters . |
| 5,060,892 | 10/1991 | Dougherty ................................ 248/57 |
| 5,074,515 | 12/1991 | Carter, Jr. . |
| 5,085,393 | 2/1992 | Ryan ................................... 248/906 X |
| 5,150,868 | 9/1992 | Kaden . |
| 5,183,233 | 2/1993 | LaPalomento ............................ 52/39 X |
| 5,303,894 | 4/1994 | Deschamps et al. . |
| 5,386,959 | 2/1995 | Laughlin et al. ................. 248/200.1 X |
| 5,435,514 | 7/1995 | Kerr, Jr. ................................... 248/343 |
| 5,522,577 | 6/1996 | Roesch ................................... 248/343 |
| 5,567,117 | 10/1996 | Gunn et al. ......................... 248/343 X |
| 5,634,311 | 6/1997 | Carlton ................................... 52/699 X |

FOREIGN PATENT DOCUMENTS

| | | |
|---|---|---|
| 2436518 | 9/1978 | France . |
| 1309950 | 9/1970 | United Kingdom . |

*Primary Examiner*—Carl D. Friedman
*Assistant Examiner*—Laura A. Callo
*Attorney, Agent, or Firm*—Shlesinger, Arkwright & Garvey LLP

[57] ABSTRACT

The mounting assembly includes a support having a first member and a second member, and a support bar disposed adjacent the first the second support members. A junction box is provided adjacent the support bar. A first fixture fastener extends from said support into the junction box cavity. The first fixture fastener is configured for transferring forces exerted on said first fixture fastener substantially without exerting such forces on the junction box.

21 Claims, 4 Drawing Sheets

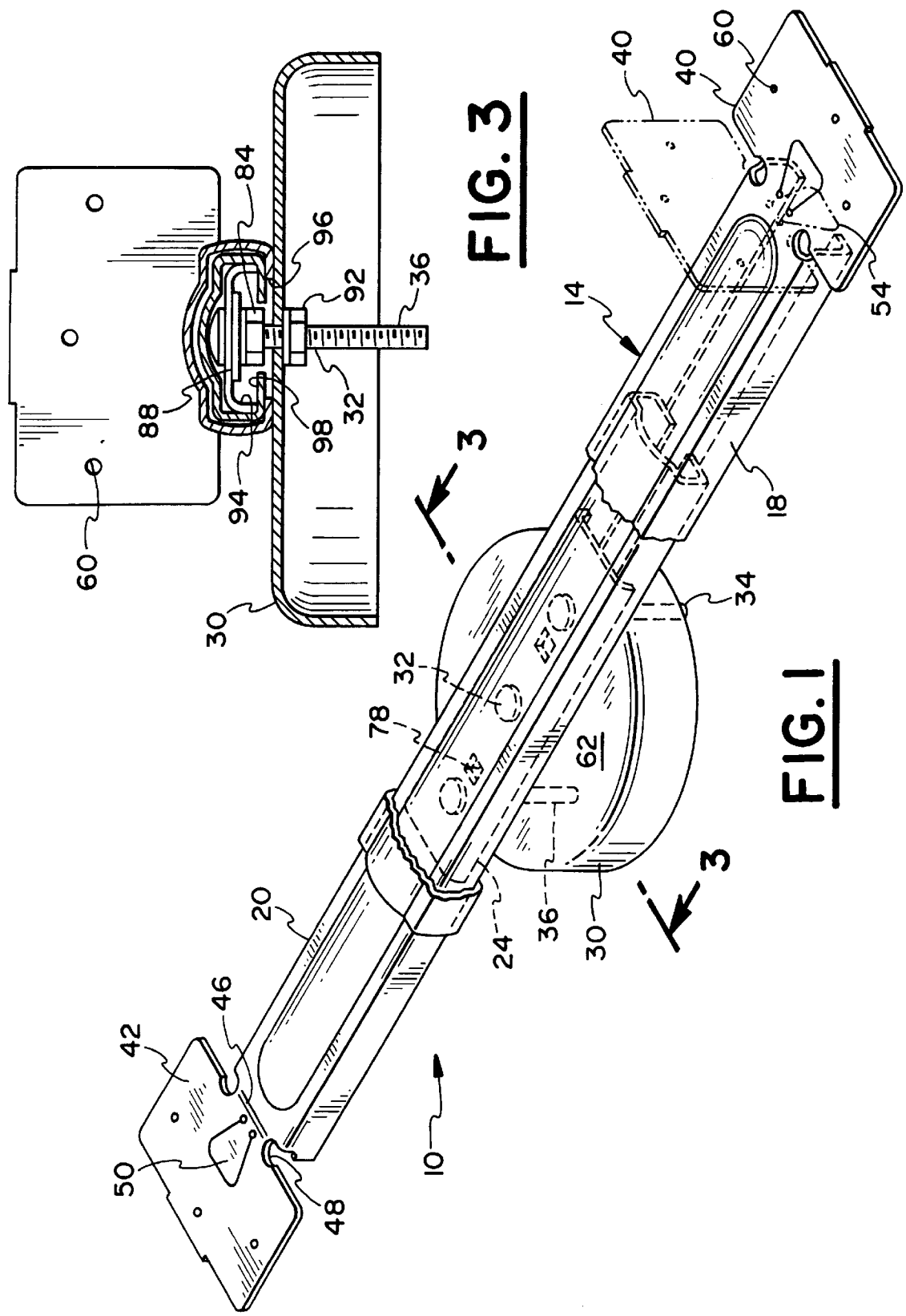

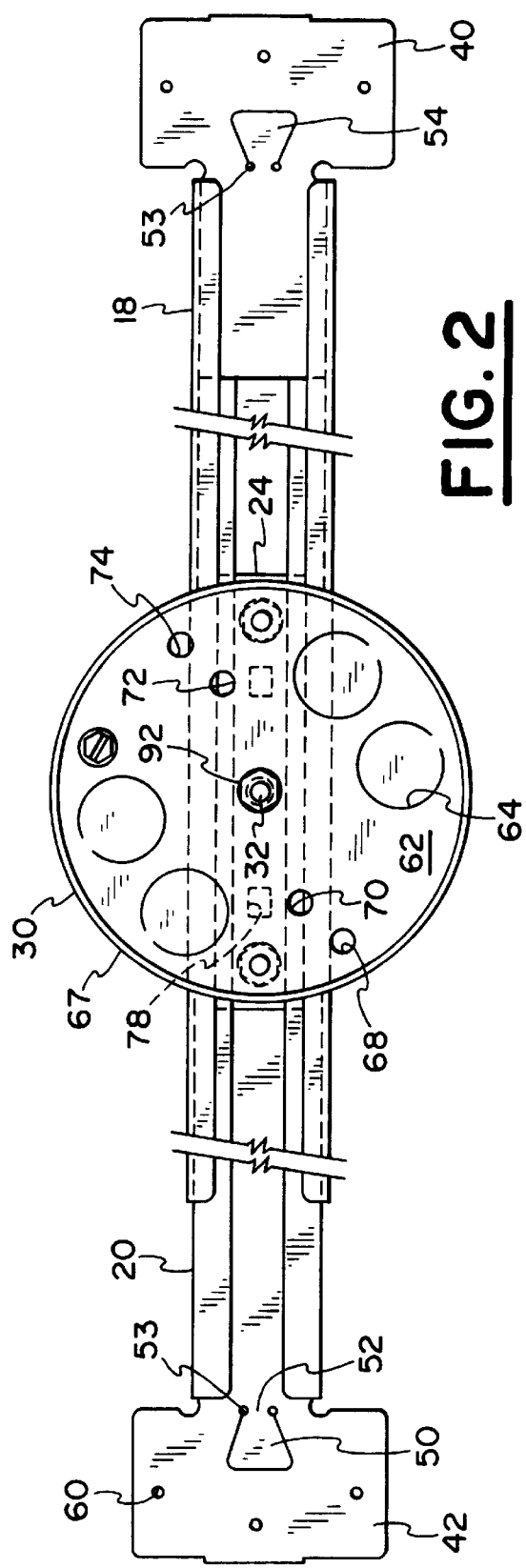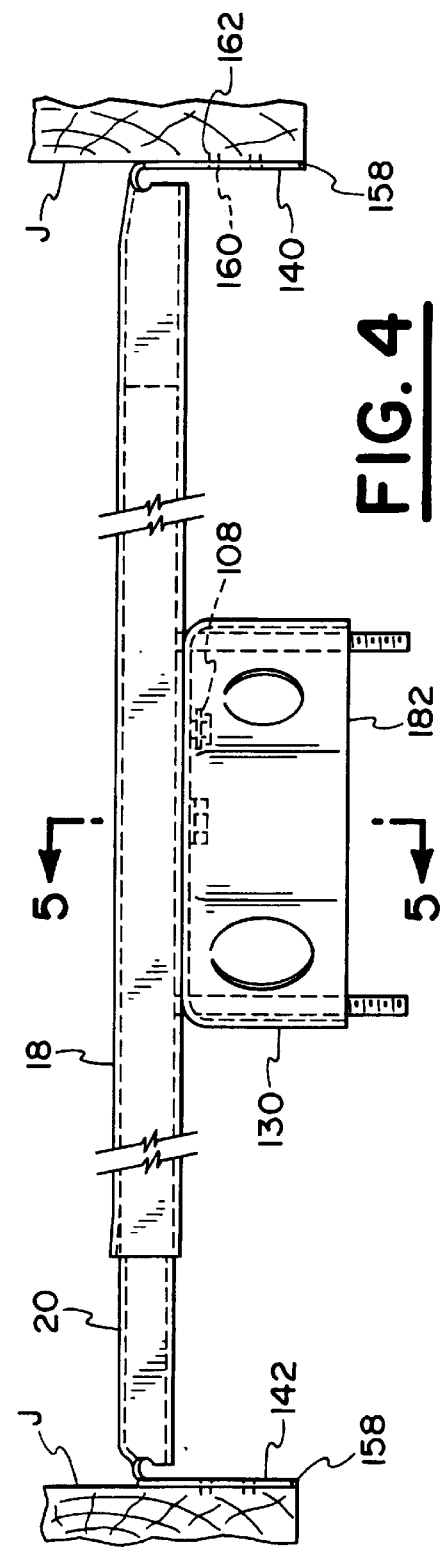

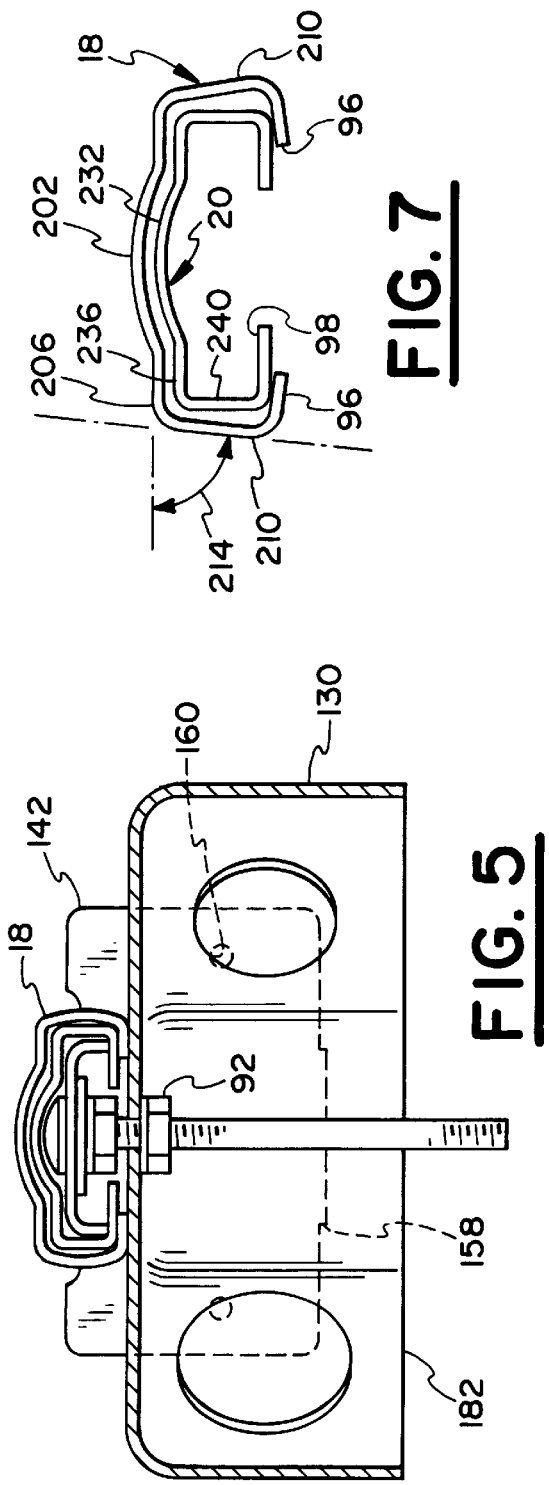

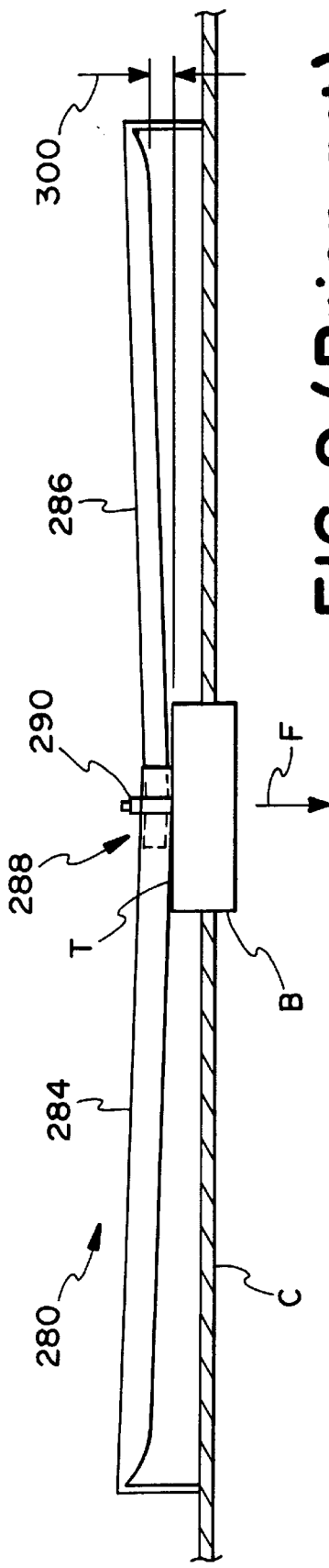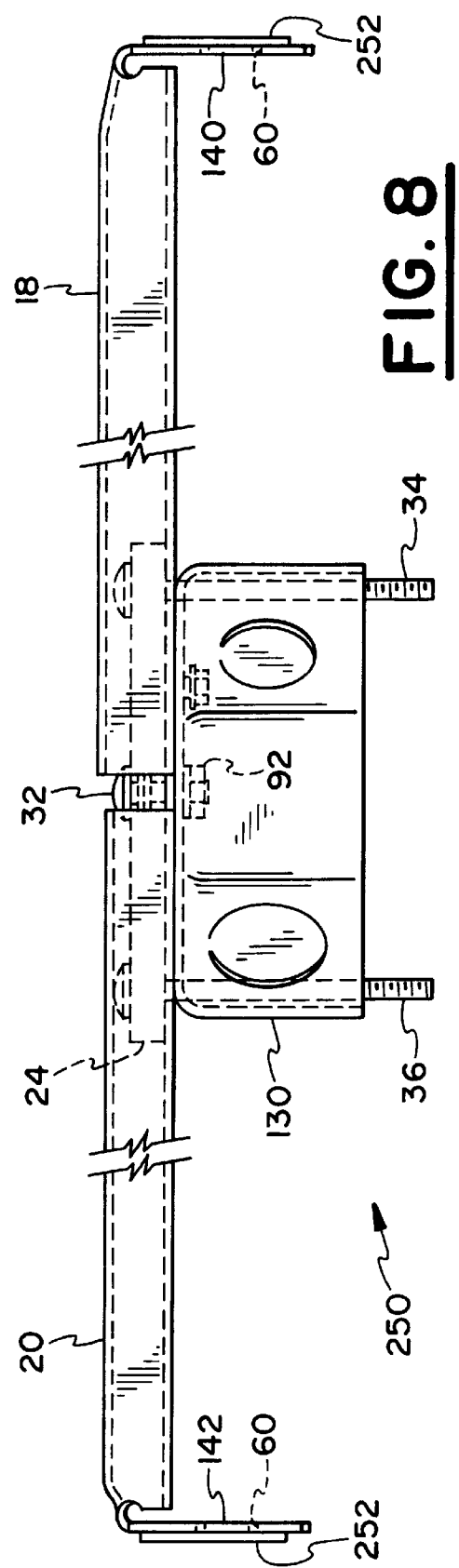

FAN BRACE SLIDE SUPPORT

CROSS REFERENCE TO RELATED APPLICATIONS

This application is a continuation-in-part of application Ser. No. 08/371,695, filed Jan. 12, 1995, now U.S. Pat. No. 5,854,443.

This application relates to application Ser. No. 08/490, 757, filed Jun. 15, 1995, now U.S. Pat. No. 5,677,512, issued Oct. 14, 1997, and which is a continuation in part of application Ser. No. 08/371,695, filed Jan. 12, 1995. This application likewise relates to: application Ser. No. 08/403, 226, filed Mar. 13, 1995; application Ser. No. 08/381,434, filed Jan. 31, 1995; and application Ser. No. 08/413,214, filed Mar. 28, 1995.

FIELD OF THE INVENTION

This invention relates to a fixture mounting assembly. In particular, the invention is directed to a fan brace slide support assembly which is particularly suited for installation in a wall, such as a ceiling.

BACKGROUND OP THE INVENTION

Conventional supports are known for mounting fixtures to ceilings during new construction, and as retrofit installations in existing structures.

Nowadays, not only are fixtures, such as chandeliers and ceiling fans, becoming even heavier than prior art fixtures, but building codes are becoming more strict. Thus, there is a need for a fixture mounting assembly which can carry relatively high static and dynamic loads.

There is likewise a need for a fixture mounting assembly which can be used for new construction as well as for retrofit installations, is easy to operate, stronger, and more stable than existing devices.

An example of existing technology is shown in my earlier U.S. Pat. No. 4,463,923 to Reiker which discloses an expandable junction box/fixture hanger assembly for heavy duty applications. Although that hanger assembly works well, there is a need for a fixture mounting assembly which is even simpler to fabricate and easier to use, while meeting the requirements of supporting heavy and/or vibrating fixtures.

U.S. Pat. No. 3,214,126 to Roos is of interest for its disclosure of an outlet box support having mating telescoping bar members 12, 14 comprising a hanger bar. The Roos sidewalls of bar member 12 have interned flanges or lips which project inwardly and are spaced from and parallel to the Roos connecting wall. Roos states that the bar members are identical except as to differences in size. Roos discloses mounting/clamping together an electrical box to the hanger bar by use of a mounting device. The Roos mounting device is considered to be relatively complicated.

U.S. Pat. No. 3,518,421 to Cogdill for a hanger structure discloses telescoping members mountable to an electrical junction box, analogous to the above-described Roos outlet box support.

U.S. Pat. No. 2,528,418 to Buckels discloses telescoping mounting members and mounting flanges having holes therein. Fasteners, such as nails or screws, are inserted through the holes in the mounting flanges for securing the Buckels device to a joist, for example. Buckels expects the depth of the mounting flanges to be substantially equal to the depth of the attached outlet box minus the thickness of the wall construction formed on the joists. Thus, Buckels expects the device to be properly located with respect to the surface of a finished wall surrounding the electrical box.

U.S. Pat. No. 2,945,661 to Appleton discloses a telescoping bar hanger assembly having mounting flanges which are mountable to a joist by hammering nails through openings provided thereon. Appleton suggests that sharp lanced or struck-out deformations having outwardly extending teeth be provided around the nail holes for facilitating the mounting of the bar hanger between joists.

OBJECTS AND SUMMARY OF THE INVENTION

Accordingly, it is an object of an invention to provide a mounting assembly which overcomes the drawbacks and disadvantages of the prior art devices.

A further object of the invention is to provide a mounting assembly which can be inexpensively manufactured.

Yet another object of the invention is to provide a mounting assembly which is suited for use in new construction as well as for retrofitting in existing walls and ceilings.

A still further object of the invention is to provide a mounting assembly configured so that large static and dynamic loads are transferred directly to the structure in which the mounting assembly is installed, as opposed to the forces being transferred to a junction box attached to the mounting assembly.

Another object of the invention is to provide a mounting assembly which is more resistant to oxidation and rusting than earlier devices.

It is yet another object of the invention to provide a mounting assembly which utilizes the strength of a substrate in which the mounting assembly is installed (i.e., a floor, wall, or ceiling) for carrying the load of a fixture attached at the junction box mounting site.

Another object of the invention is to provide a mounting assembly which is easier and faster to install and use than conventional devices.

Yet a further object of the invention is to provide a mounting assembly having an attachment site to which fixtures can be more readily attached than with conventional devices.

A yet further object of the invention is to provide a mounting assembly having an expandable support which is infinitely adjustable for mounting between joists, for example.

Another object of the invention is to provide a mounting assembly in which relatively adjustable mounting members can be moved easily relative to each other, yet which mounting members can be easily rigidly locked together for enhancing the load-carrying characteristics thereof.

A yet further object of the invention is to provide a mounting assembly which is further strengthened when a fixture is attached thereto.

In summary, therefore, the invention is directed to a mounting assembly which is strong, easily and readily used, and which overcomes the drawbacks of prior art devices.

In one embodiment of the invention, the mounting assembly includes a support having a first member and a second member, and a support bar disposed adjacent the first and second support members. A junction box is provided adjacent the support bar. A first fixture fastener extends from said support into the junction box cavity. The first fixture fastener is configured for transferring forces exerted on said first fixture fastener substantially without exerting such forces on the junction box.

In another preferred embodiment of the invention, a mounting assembly is provided having means for supporting a fixture relative to a wall, said support means including first and second members disposed adjacent each other. A support bar is provided, and a junction box is located adjacent the support bar. A first fixture fastener extends from the support into the junction box cavity, and the first fixture fastener is configured for transferring forces exerted on the first fixture fastener substantially without exerting such forces on the junction box.

The invention will be further described with reference to the following drawings.

BRIEF DESCRIPTION OF THE DRAWINGS

FIG. 1 is a perspective view of a first preferred embodiment of a mounting assembly according to the invention;

FIG. 2 is a bottom plan view of the first preferred embodiment of the mounting assembly of FIG. 1;

FIG. 3 is a sectional view taken along line 3—3 of FIG. 1;

FIG. 4 is a side elevational view of a further preferred embodiment of a mounting assembly according to the invention;

FIG. 5 is a sectional view taken along line 5—5 of FIG. 4;

FIG. 6 is a further, partial sectional view of the preferred embodiment of FIG. 4;

FIG. 7 is a somewhat schematic, sectional view of the first and second sliding members according to a preferred embodiment of the invention, when in an unclamped, slidable state;

FIG. 8 is a side view of a still further preferred embodiment of a mounting assembly according to the invention; and FIG. 9 is a PRIOR ART device, when in use.

DETAILED DESCRIPTION OF THE INVENTION

Turning to FIGS. 1–3, a first preferred embodiment of a mounting assembly 10 according to the invention is shown.

Mounting assembly 10 includes a hanger bar 14 having an outer support element 18 and an inner support element 20. Preferably, outer support element 18 is slidable relative to inner support element 20 when being installed.

An elongated internal slide member 24 is provided for strengthening the overall hanger bar 10. Preferably, internal slide member 24 is configured for attaching a junction box 30, as well as an unillustrated fixture, such as a ceiling fan and the like. Good results have been achieved when internal slide member 24 is provided substantially adjacent the outer and inner support elements 18 and 20. A junction box fastener 32 attaches junction box 30 to hanger bar 14 such that the upper surface of junction box 30 serves as an external slide member.

A first coupling shaft 34 extends from inner slide member 24 through junction box 30 for transferring forces exerted by a fixture mounted on first coupling shaft 34 substantially directly to hanger bar 14 without transmitting such forces onto junction box 30. Good results have been achieved when a second coupling shaft 36 is used in conjunction with first coupling shaft 34.

A first mounting plate or vertical end 40 is provided on a free end of outer support element 18.

Preferably, a second mounting plate or vertical end 42 is provided on the spaced, opposed free end of inner support element 20. Optionally, a connector 46 may be provided between second mounting plate 42 and inner support element 20. For example, connector 46 can be in the form of an area of reduced material thickness, such as by the provision of a groove made by cutting or stamping. To further enhance the bendability of second mounting plate 40 relative to inner support element 20, for example, optional stress relief cut-outs 48 can be provided.

Still further, a tab 50 can be provided, which tab 50 is secured at an attachment site 52. Optional stress-relief cut-outs or through-holes 53 can be provided. A free edge 54 is configured to align with a joist and/or ceiling when installed, as described below under OPERATION.

Good results have been realized when connector 46 was retained and cut-outs 48 and through-holes 53 were omitted.

First mounting plate 40, second mounting plate 42, and tab 50 can be bent relative to respective first member 18 and inner support element 20 before or after sale to the end user, as will be discussed further under OPERATION below.

One or more mounting holes 60 are preferably provided in first and second mounting plates 40, 42.

In addition, one or more punch-outs 64 are preferably provided in a bottom 62 of junction box 30. Typically, punch-out 64 will be spaced from a wall 67 which further defines the cavity of junction box 30.

A plurality of supplemental holes 68, 70, 72, and 74 may be provided in bottom 62 of junction box 30. Supplemental holes 68, 70, 72 and 74 may be formed as square holes to mate with the square neck portion of conventional carriage bolts. First and second coupling shafts 34 and 36 may be such carriage bolts.

The provision of multiple holes, including supplemental holes 68, 70, 72 and 74 allows for varying the spacing between first coupling shaft 34 and second coupling shaft 36. Thus, in the illustrated first preferred embodiment, such as shown in FIGS. 1 and 2, first coupling shaft 34 is spaced apart from second coupling shaft 36 at the greatest illustrated distance. If the fixture to be attached to first and second coupling shafts 34, 36 requires a narrower distance, then second coupling shaft 36 can be moved closer to first coupling shaft 34 by loosening thereof, and moving second coupling shaft 36 to hole 78. In such a case, junction box 30 would be rotated slightly about junction box fastener 32, until supplemental hole 70 aligns with alternate square hole 78. Second coupling shaft 36 would then be inserted through both square hole 78 and supplemental hole 70.

Features of hanger bar 14 can be further understood by considering FIGS. 3, and 7, which is described in greater detail below.

FIG. 3 illustrates how hanger bar 14 can be rigidified. Junction box fastener 32 can be detachably secured to internal support member 24 by use of a nut 84, such as a conventional self-locking nut. A washer 88 can be provided between nut 84 and internal slide member 24.

A further nut, such as a self-locking nut 92, can be used for securing junction box 30 to hanger bar 14. Clamping means, such as an extension 94 on internal slide member 24 can be configured for engaging a lip 98 on inner support element 20, which lip 98 abuts a further lip 96 on outer support element 18. FIG. 3 illustrates the locked, rigidified state of hanger bar 14 when self-locking nut 92 has been tightened against junction box 30 with sufficient torque so that relative movement between internal slide member 24, second member 20 and outer support element 18 is prevented. In that manner, hunger bar 14 assumes its rigidified, essentially integral state of greatest strength.

FIGS. 4–6 illustrate a further preferred embodiment of a mounting assembly 100 according to the invention.

Mounting assembly 100 has many elements in common with the mounting assembly 10 of FIGS. 1–3. One of the differences is that a junction box 130 can be provided with a larger cavity and, hence, useable volume for making wiring connections. Thus, in this preferred embodiment, a wall 168 of junction box 130 will be relatively long.

A first mounting plate 140 is provided on a free end of outer support element 18, and a second mounting plate 142 is provided on a spaced opposed free end of internal support element 20.

An electrical grounding screw 108 is conveniently provided inside junction box 130.

First and second mounting plates 140, 142 preferably extend in the direction of the side on which junction box 130 is mounted. Namely, first and second mounting plates 140, 142, extend downwardly as viewed in FIG. 4 (and as viewed when mounting assembly 100 is installed in a ceiling for mounting a ceiling fan, for example).

A plurality of mounting holes 160 is provided in each of first and second mounting plates 140, 142. Good results have been achieved when sharp extensions or "blowouts" 162 extend outwardly from first and second mounting plates 140, 142. Blowouts 162 can be manufactured at the same time as mounting holes 160 by the use of a punch which pierces first mounting plate 140, for example, forms mounting hole 160, and leaves punched-out material attached to first mounting plate 140 that functions as a securing and mounting element when mounting assembly 100 is in use. For example, blowouts 162 will be fabricated sufficiently sharp so as to be easily stabbed into a typical wooden joist J, as described under OPERATION below.

FIG. 7 is somewhat of a schematic end view of outer support element 18 and inner support element 20 when in an unclamped, freely telescopically slidable state. The embodiment of FIG. 7 is used with the preferred embodiments of FIGS. 1–3 and 4–6.

Outer support element 18 includes a substantially planar central region 202, and an outer region 206. Central region 202 can have an outwardly curved configuration for resisting bending and strengthening outer support element 18. A substantially vertically oriented side wall 210 extends away from outer region 206. Good results have been obtained when outer region 206 and side wall 210 define an angle therebetween of about 95°–100°; in other words, an angle 214 will be about 80°–85°.

Inner support element 20 includes a central region 232 and an outer region 236 extending therefrom. A substantially vertically oriented side wall 240 is attached to and extends away from outer region 236. Lip, or flanged edge 98 extends inward and away from side wall 240. Good results have been achieved when side wall 240 and outer region 236 define an angle of about 90° therebetween, when second member 20 having such a 90° included angle has been used with the outer support element 18 having the included angle of about 95°–100°, as described immediately above.

It has been found that the illustrated profiles of outer support element 18 and inner support element 20 slide well relative to each other when loose, and resist sliding when outer support element 18, inner support element 20, internal slide member 24, and junction box 130 have been clamped together as shown in FIGS. 4–6 (as well as shown in FIGS. 1–3, described above).

The configurations of outer and inner support elements 18, 20 illustrated in FIG. 7 satisfy many of the objects of the invention; namely, outer and inner support elements 18, 20 are readily and inexpensively manufactured, while optimizing the use of materials, and achieving the goal of an adjustable length support which is easily adjusted, yet which is strong and rigid when in its clamped state.

FIG. 8 illustrates a still further preferred embodiment of a mounting assembly 250 according to the invention.

Many elements of mounting assembly 250 are similar to those of mounting assembly 100 of the preferred embodiment of FIGS. 4–6.

A difference is that a piece of double-sided tape 252 is placed on one or both of first and second mounting plates 140, 142. As illustrated, double-sided tape 252 substitutes for sharp extensions or blowouts 162 of the preferred embodiment of FIGS. 4–6.

It is contemplated that double-sided tape 252 be used in addition to such blowouts, depending on the intended use. It is likewise contemplated that other tapes, adhesives, glue patches, and the like be used instead of, or in addition to double-sided tape 252. It is important that the adhesive used be sufficiently strong to temporarily support mounting assembly 250 in place, while fasteners are being inserted through mounting holes 60 for permanent installation. It is likewise expected that a spray adhesive be applied instead of tape 252.

FIG. 8 likewise illustrates how mounting assembly 250 can be successfully installed between widely spaced apart joists. As illustrated, mounting assembly 250 has been opened to a setting which is so wide that outer support element 18 no longer overlaps inner support element 20. Thanks to the inherently strong construction of mounting assembly 250, the assembly 250 is sufficiently strong even when in such an expanded position.

In the illustrated position, it will be appreciated that inner support element 20, internal slide member 24, and junction box 130 have been locked relative to each other. Self-locking nut 92 has been tightened against junction box 130 with sufficient torque so as to achieve that locked, rigidified state. In a like manner, outer support element 18, internal slide member 24, and junction box 130 have been tightened relative to each other and rigidified at the same time by self-locking nut 92 and junction box fastener 32.

The preferred embodiments of FIGS. 1–3 and 4–6 can have their outer and inner support elements 18, 20 likewise extended and rigidified as in this preferred embodiment of FIG. 8.

FIG. 9 illustrates a PRIOR ART device 280 having a left support 284 and a right support 286, which are movable relative to each other. An overlapping portion 288 is established by the free ends of left support 284 and right support 286 being clamped by conventional fastener 290. Owing to the weight of junction box B and the associated fixture applying a downward force F such PRIOR ART devices 280 have a tendency to sag. Such sagging results in an undesirable gap 300 between the intended location of the top T of junction box B and the resultant, actual location thereof.

Accordingly, PRIOR ART device 280 have a tendency to come apart (i.e., free ends of left and right supports 284, 286 disengage and separate). Thus, structurally unsound, and unaesthetic sagging of ceiling C results from gap 300 arising during use.

OPERATION

Mounting assembly 10 of the first preferred embodiment of FIGS. 1–3 is used and installed as follows.

In the case where mounting assembly 10 is to be installed in the ceiling of a building, the user ensures that nut 92 is sufficiently backed off so that outer support element 18, inner support element 20, internal slide member 24 and external slide member or junction box 30 move easily relative to each other.

In the case where mounting assembly 10 is to be installed between a pair of spaced apart existing joists J, the user slides outer support element 18 outwardly away from inner support element 20 a sufficient distance so that first mounting plate 40 engages the side of a joist and second mounting plate 42 engages the side of an adjacent joist. Fasteners, such as nails or screws, are inserted through mounting holes 60 and secure mounting plates 40, 42 to the respective joists.

The phantom line depiction of first mounting plate 40 shows the orientation thereof when installed.

Likewise, the phantom line designation of tab 50 shows the orientation thereof when installed.

In the case of new construction, when there is no ceiling attached to the joists, the user aligns free edge 54 of tab 50 with the bottom free edge of the joist to provide the correct spacing for installing a typical drywall ceiling.

In the case of a retrofit installation with an existing ceiling attached below the joists, the user simply installs mounting assembly 10 from above (when access to the installation site is available from above, such as from an attic in a residential house). When no attic access is available the user slides the entire mounting assembly 10 upwardly through a hole made in the ceiling. For example, the user can slide assembly 10 through a junction box aperture. With an existing ceiling, the installer can simply allow free edges 54 of respective tabs 50 to rest on the ceiling while the installer permanently secures first and second mounting plates 40, 42 to the joists.

After mounting assembly 10 has been secured to the joists, the final operating length of hanger bar 14 is established.

The installer fixes that final established length and rigidities and strengthens hanger bar 14 by clamping outer support element 18, inner support element 20, internal slide member 24, and external slide member or junction box 30 together.

Such a rigidly clamped together state is achieved by tightening down junction box nut 92 on junction box fastener 32, thereby pressing the upper surface of junction box 30 which serves as the external slide member tightly against lips 96 on outer support element 18, which lips 96 press against lips 98 on inner support element 20, while bent down extensions or edges 94 on internal slide member 24 concurrently press against lips 98 along a linear surface. See FIGS. 3, 5, and 7, for example.

In addition, good results have been achieved when outer support element 18, inner support element 20, internal slide member 24, and junction box 30 are rigidly clamped together at second and third locations; namely, when nuts are tightened down on first coupling shaft 34 and on second coupling shaft 36.

As will be readily apparent, the tightening of nuts on first and second coupling shafts 34, 36 presses the upper surface of junction box 30 or external slide member upward tightly against lips 96 of outer support element 18 while the heads of first and second coupling elements 34, 36 press downward tightly against internal slide member 24, whereby the downwardly bent edges or extensions 94 press tightly against lips 98 on inner support element 20 and, hence, against lips 96. The nuts attached to the lower ends of first and second coupling shafts 34, 36 can engage and retain junction box 30 to hanger bar 14 in the same way that nut 92 is attached to the lower end of junction box fastener 32 engages and retains junction box 30 to hanger bar 14.

Likewise, good results have been achieved when nuts are used on first and second coupling shafts 34, 36 outside of junction box 30 for pressing against a cover plate on junction box 30 or for securing a fixture to coupling shafts 34 and 36 and, hence, pressing junction box 30 tightly against hanger bar 14 (i.e., tightly against lips 96 of outer support element 18).

Once junction box 30 has been clamped tightly, then a fixture, of first and second coupling shafts 34, 36.

The installation of the preferred embodiment of FIGS. 4–6 is similar to the installation of the embodiment of FIGS. 1–3.

It should be noted that in the embodiment of FIGS. 4–6, when assembly 100 is installed in a ceiling, for example, first and second mounting plates 140, 142 extend downwardly, as shown in FIG. 5. The free edges of mounting plates 140, 142 and/or the free edge of supplemental spacing element 158 is substantially aligned with the lower free edge of a joist J, and then mounting assembly 100 is secured in place between the adjacent joists J by fasteners inserted through holes 160. Blowouts 162, when provided, are used to temporarily secure mounting assembly 100 in place.

It will be appreciated that the distance between the free edge of first and second mounting plates 140, 142 or the free edge of supplemental spacing element 158 and free edge 182 of junction box 130 is preferably sized so that a typical ceiling material, such as drywall, fits therein and has its outward face substantially aligned with free edge 182.

As will be appreciated, mounting assembly 250 of the embodiment of FIG. 8 is installed in a manner similar to the installation of assembly 100 described immediately above. A difference is that adhesive or double-sided tape 250 is used for temporarily attaching mounting assembly 250 in place. Depending on the type of adhesive or tape used, and the intended use, a protective coating or removable cover material will protect double-sided tape 252 from degradation during storage prior to use.

It is contemplated that the fixture mounting assembly will be made of materials such as galvanized steel, plastics, and the like.

It should be understood that the size and configuration of the outer and inner support elements, the junction boxes, the fasteners, and the like will be varied as required.

Goods results have been achieved when the length of the internal slide member was made substantially equal to the width of the junction box.

While this invention has been described as having a preferred design, it is understood that it is capable of further modifications, uses and/or adaptations of the invention following in general the principle of the invention and including such departures from the present disclosure as come within the known or customary practice in the art to which to invention pertains and as may be applied to the central features hereinbefore set forth, and fall within the scope of the invention and of the limits of the appended claims.

I claim:

1. A sag resistant hanger bar having a telescopically adjustable length comprising:

a) telescopically configured inner and outer support elements with walls forming a longitudinally extending internal passageway and terminating in opposing, spaced apart edges defining a longitudinally extending slot having a defined width;

b) an elongated internal slide member at least a portion of which is positionable within and longitudinally displaceable along the length of the internal passageway and having elongated spaced apart edges with at least first and second spaced apart edge length segments engaging the edges of at least one of the support elements;

c) an elongated external slide member positionable below the slot, longitudinally displaceable along the length of the internal passageway and having a width exceeding the slot width;

d) at least one fastener for interconnecting and controlling the spacing between the internal and external slide members, for increasing the spacing between the internal and external slide members to allow the slide members to be longitudinally displaced along the length of the slot and for decreasing the spacing between the internal and external slide members to compress at least the first and second edge length segments of the internal slide member against the edges of the support element, wherein the first and second edge length segments are located outboard of and longitudinally offset from the fastener, to reinforce the support elements outboard of the fastener to restrict downward sagging deflection of the hanger bar in response to the application of a load to thereby substantially increase the load bearing capacity of the hanger bar.

2. The hanger bar of claim 1 wherein the fastener decreases the spacing between the internal and external slide members along a first edge length segment of the external slide member wherein the first segment of the external slide member is edge length segment of the external slide member is longitudinally offset from and positioned outboard beyond the fastener.

3. The hanger bar of claim 2, wherein the first edge length segments of the internal and external slide members are longitudinally offset from the fastener in a first direction.

4. The hanger bar of claim 2 wherein the first edge length segments of the internal and external slide members are longitudinally offset from the fastener in first and second opposing directions.

5. The hanger bar of claim 4 wherein the length of the internal slide member exceeds the length of the external slide member.

6. The hanger bar of claim 2 wherein a sandwich having at least four layers is formed within at least a portion of the first edge length segments of the internal and external slide members.

7. The hanger bar of claim 6 wherein the sandwich is defined at least in part by the edges of the internal and external slide members and by the opposing edges of the inner and outer support elements.

8. The hanger bar of claims 1 or 2 wherein at least a portion of the edges of the internal slide member are bent downward and directly engage the edges of the support elements to increase the rigidity of the internal slide member.

9. The hanger bar of claim 8 wherein the downward bent portions of the internal slide member edges create a second longitudinally extending internal passageway.

10. The hanger bar of claim 9 wherein the downwardly bent edges of the internal slide member define linear engagement surfaces for engaging the upper surfaces of the adjacent edges of the adjacent support element.

11. The hanger bar of claim 10 wherein the internal slide member includes a substantially planar midsection interconnecting the downwardly bent edges and wherein the planar midsection is elevated above the edges of the inner support element.

12. The hanger bar of claim 11 wherein the planar midsection of the internal slide member includes an aperture through which the fastener extends.

13. The hanger bar of claim 12 wherein the external slide member includes an aperture through which the fastener extends.

14. The hanger bar of claim 8 wherein the walls of the inner and outer support elements each include a substantially horizontally oriented upper section and substantially vertically oriented opposing side walls and wherein the opposing edges of the inner and outer support elements extend substantially horizontally inward from the vertical side walls.

15. The hanger bar of claims 11 or 2 wherein the fastener includes a threaded coupling shaft and a threaded nut for engaging the threads of the threaded coupling shaft.

16. The hanger bar of claims 1 or 2 wherein the external slide member forms a part of an electrical junction box.

17. The hanger bar of claim 16 wherein the junction box includes a substantially planar upper surface.

18. The hanger bar of claims 1 or 2 further including at least one coupling shaft longitudinally spaced apart from the fastener and attached to and extending downward from the internal slide member through the slot in the inner and outer support elements to engage the external slide member and to prevent relative rotation between the support elements and the external slide member.

19. The hanger bar of claims 1 or 2 wherein the inner and outer support elements further include first and second spaced apart vertical ends and wherein each end includes an outer surface with an adhesive coupling element disposed on the outer surface.

20. The hanger bar of claim 19 wherein the adhesive coupling element includes a length of adhesive tape.

21. The hanger bar of claim 20 wherein the length of adhesive tape includes a length of double-sided tape having a first adhesive surface coupled to the outer surface of the vertical end of the support element, an opposing second adhesive surface and a layer of release paper for releasably covering the second adhesive surface.

* * * * *